United States Patent
Lee

(10) Patent No.: US 9,615,416 B2
(45) Date of Patent: Apr. 4, 2017

(54) APPARATUS FOR SENSING INPUT POWER SOURCE

(71) Applicant: LG INNOTEK CO., LTD., Seoul (KR)

(72) Inventor: Yong Hee Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/204,013

(22) Filed: Jul. 7, 2016

(65) Prior Publication Data

US 2017/0013687 A1 Jan. 12, 2017

(30) Foreign Application Priority Data

Jul. 8, 2015 (KR) .................. 10-2015-0097251

(51) Int. Cl.
| | | |
|---|---|---|
| H05B 37/02 | (2006.01) | |
| H05B 33/08 | (2006.01) | |
| H02M 3/335 | (2006.01) | |

(52) U.S. Cl.
CPC ........ H05B 33/0815 (2013.01); H02M 3/335 (2013.01); H02M 3/33507 (2013.01); H05B 33/0845 (2013.01); H05B 33/0851 (2013.01); H05B 37/02 (2013.01)

(58) Field of Classification Search
CPC ............ H05B 33/0815; H05B 33/0851; H05B 33/045; H05B 37/02; H02M 3/335; H02M 3/33507

See application file for complete search history.

(56) References Cited

U.S. PATENT DOCUMENTS

| | | | | |
|---|---|---|---|---|
| 6,486,616 B1* | 11/2002 | Liu | ...................... | H05B 41/3921 315/209 R |
| 2011/0031899 A1 | 2/2011 | Chu et al. | | |
| 2011/0194311 A1* | 8/2011 | Gaknoki | ............... | H02M 7/217 363/21.12 |
| 2011/0260645 A1* | 10/2011 | Chen | ..................... | G09G 3/3406 315/294 |

(Continued)

FOREIGN PATENT DOCUMENTS

| | | |
|---|---|---|
| KR | 10-2014-0088440 A1 | 7/2014 |
| KR | 10-2015-0051028 A1 | 5/2015 |

OTHER PUBLICATIONS

Mullett C. et al., "Improving the Regulation of. Multi-Output Flyback Converters", Applied Power Electronics Conference and Exposition APEC 2009., Twenty-Fourth Annual IEEE, IEEE, Piscataway, NJ, USA, Feb. 15, 2009.

(Continued)

*Primary Examiner* — Don Le
(74) *Attorney, Agent, or Firm* — LRK Patent Law Firm

(57) ABSTRACT

An apparatus for sensing input power source includes; an input power source; a rectifier for rectifying input power source (Vin) of the input power source into rectified power source (Vr); a dimming interface for sensing the state of the input power source; a first light; and a converter for converting the rectified power source (Vr) into a first power source (V21) and a second power source (V22) which were preset to apply them to the dimming interface and the first light, wherein the dimming interface and the first light are connected with the converter in a feedback type.

16 Claims, 6 Drawing Sheets

(56) References Cited

U.S. PATENT DOCUMENTS

| | | | |
|---|---|---|---|
| 2012/0062136 A1* | 3/2012 | Tsai | H05B 33/0851 315/224 |
| 2012/0112645 A1* | 5/2012 | Lee | H05B 33/0818 315/186 |
| 2012/0224397 A1* | 9/2012 | Yeh | H02M 3/33507 363/21.12 |
| 2016/0119998 A1* | 4/2016 | Linnartz | H05B 33/806 315/307 |
| 2016/0165691 A1* | 6/2016 | Fassbender | H05B 33/0845 315/149 |
| 2017/0012538 A1* | 1/2017 | Barrenscheen | H02M 3/33507 |

OTHER PUBLICATIONS

Carl Nelson, "Application Note 19-LT1070 Design Manual", Jun. 1, 1986.

Search Report regarding European Patent Application No. 161785027 which corresponds to the above referenced U.S. application.

* cited by examiner

APPARATUS FOR SENSING INPUT POWER SOURCE

CROSS REFERENCE TO RELATED APPLICATION

This application claims priority to Korean Patent Application No. 10-2015-0097251, filed Jul. 8, 2015, which is hereby incorporated by reference in its entirety into this application.

BACKGROUND OF THE INVENTION

1. Field of the Invention

The present invention, relates to an apparatus for sensing input power source which includes an input power source; a rectifier for rectifying input power source (Vin) of the input power source into rectified power source (Vr); a dimming interface for sensing the state of the input power source; a first light; and a converter for converting the rectified power source (Vr) into a first power source (V21) and a second power source (V22) which were preset to apply them to the dimming interface and the first light, wherein the dimming interface and the first light are connected with the converter in a feedback type.

2. Description of Related Art

In general, light emitting diodes (LEDs) are a sort of semiconductor devices which convert electric energy into light. The LEDs are lower in power consumption than conventional light sources, such as fluorescent lamps or incandescent lamps and have various advantages of semi-permanent lifespan, rapid speed of response, safety and environment friendliness. Particularly, LED lighting devices can show various effects through control of flickering order, luminous colors and brightness of a plurality of arrayed LEDs.

Therefore, lots of studies to substitute the conventional light sources with LEDs have been made, and the use of LEDs as light sources for lighting devices, such as various lamps, liquid crystal display devices, electric sign boards, street lamps and so on, which are used outdoors is on a rising trend. Especially, LEDs are also used as lighting for room interior, stage lighting for showing a special atmosphere, lighting for advertisement, landscape lighting and so on.

Lighting devices as landscape lighting may he installed on the outer wall of a building, in a park, on a street lamp,: on a bridge rail or in a performing place, and sizes and application systems of the lighting devices may be changed according to applied purposes, targets or locations. That is, the lighting devices installed on the outer wail of a building are used just to provide a flickering function in a band type or used for simple expression of a single color or a combined color, and the lighting devices installed in a park or on a street lamp or a bridge rail are irregularly installed according to the form, of the object to which the lighting devices are installed while changing flickers or colors.

In this instance, referring to FIG. 1, because a conventional lighting control apparatus is varied in LED disusing degree according to input power sources, in order to sense the state (150V to 250V) of input voltage in real time and receive a value, the conventional lighting control apparatus essentially includes various components at the primary -winding, for instance, an AC input sensor 180, an AC/DC rectifier 170 and a transmitter 160.

However, because countries in the world have different safety requirements for lighting devices and it is difficult to realize standards of lighting control apparatuses to satisfy all countries, various studies to apply a configuration of circuits and components which are not against the safety requirements of an isolated converter have been made.

SUMMARY OF THE INVENTION

Accordingly, the present invention has been made in view of the above-mentioned problems occurring in the prior art, and it is an object of the present invention to provide an apparatus for sensing input power source capable of simplifying structure and miniaturizing parts by removing unnecessary components of the primary side due to a dimming interface mounted at the secondary side.

The present invention is not limited to the above-mentioned object, and additional various objects will be apparent from the following detailed description of the present invention within the technical scope, which is obvious to those skilled in the art.

To accomplish the above object, according to the present invention, there is provided an apparatus for sensing input power source including: an input power source; a rectifier for rectifying input power source (Vin) of the input power source into rectified power source (Vr); a dimming interface for sensing the state of the input power source; a first light; and a converter for converting the rectified power source (Vr) into a first power source (V21) and a second power source (V22) which were preset to apply them to the dimming interface end the first light, wherein the dimming interface and the first light are connected with the converter in a feedback type.

Moreover, in the preferred embodiment of the present invention, the converter includes: a transformer having a winding of the primary side and a plurality of windings of the secondary side; a switch for turning on and off the converter; and a PWM controller for controlling the switch.

In this instance, in the preferred embodiment of the present invention, the transformer includes: a first winding which is located at the primary side to receive the rectified power source (Vr); a second winding which is located at the secondary side to receive the first power source (V21) according to the turns ratio with the first winding and is connected to the dimming interface; and a third winding which is located at the secondary side to receive the second power source (V22) according to the turns ratio with the first winding and is connected to the first light.

Furthermore, in the preferred embodiment of the present invention, the turns ratio of the first winding to the second winding is 1:N1 and the turns ratio of the first winding to the third winding is 1:N2. The first winding and the switch are connected to each other in series.

Additionally, the second winding is a forward converter which is in the same direction as the first winding, and the third winding is a flyback converter which is in the reverse direction to the first winding.

In addition, the apparatus for sensing input power source further includes a second light, a third light, . . . , and a nth light, wherein the transformer includes a plurality of windings which are located at the secondary side to receive power source according to the turns ratio with the first winding and are respectively connected to a plurality of the lights.

In this instance, in the preferred embodiment of the present invention, the windings are flyback converters which are in the opposite direction to the first winding, and the second light, the third light . . . and the nth light are reconnected with the converter in the feedback type.

Moreover, in the preferred embodiment of the present invention, the switch is an FET, and the PWM controller is connected with a gate of the FET.

Furthermore, in the preferred embodiment of the present invention, the input power source (Vin) is commercial RC power source (220V), and the rectifier is a bridge rectifier.

Meanwhile, in the preferred embodiment of the present invention, the dimming interface includes: a dimming output terminal for sensing the output power source when the output power source is applied in proportion to the preset input power source; a peak rectifier for rectifying the output power source into DC; and a dimming signal generator which is connected with the peak rectifier in series to generate references, In this instance, in the preferred embodiment of the present invention, the output power source of the output terminal is determined by the following formula:

$$V_{in} = \frac{1}{N1} \times \frac{1}{D} \times V_{out},$$

wherein Vin is input power source, Vout is output power source, N1 is a turns ratio of the second winding, and D is a cycle of input power source.

Additionally, in the preferred embodiment of the present invention, the apparatus for sensing input power source further includes: a compensator which compensates according to references generated by the dimming interface and transfers a compensated value to the feedback controller; and a feedback controller which transfers the value compensated by the compensator to the converter.

In this instance, in the preferred embodiment of the present invention, the compensator is connected with the dimming interface and the first light, and the compensator and the feedback controller are connected to the PWM controller of the converter in series.

The conventional lighting control apparatus has a disadvantage in that a configuration of circuits to satisfy the safety requirements is required and must be applied to components because components, such as the AC input sensor, the AC/DC rectifier, the transmitter and the u-processing unit, are mounted at the primary side in order to sense input power source.

However, the apparatus for sensing input power source according to the preferred embodiment of the present invention can directly sense input power source of the primary side at the secondary side because a winding is additionally disposed at the secondary side of the transformer 231 of the converter to connect the dimming interface.

For this, a winding 233 for the forward converter is additionally mounted on the transformer 231 and output voltage is converted into peak output voltage through a peak rectifier so as to sense the state of input power source for implementing the existing AC dimming. Therefore, the present invention does not need the component to transfer the value of the sensed input power source to the dimming interface.

Moreover, the conventional apparatus has a disadvantage in that all of the first circuit and the second circuit must be inspected for maintenance. However, the apparatus for sensing input power source according to the preferred embodiment of the present invention has an advantage in that only the dimming interface 240 included in the second circuit is inspected.

Furthermore, if a converter is mounted, the apparatus for sensing input power source according to the preferred embodiment of the present invention does not require additional Configuration of circuits and applied components fox satisfying the safety requirements which are different in many countries, thereby simplifying the structure and miniaturizing the components.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
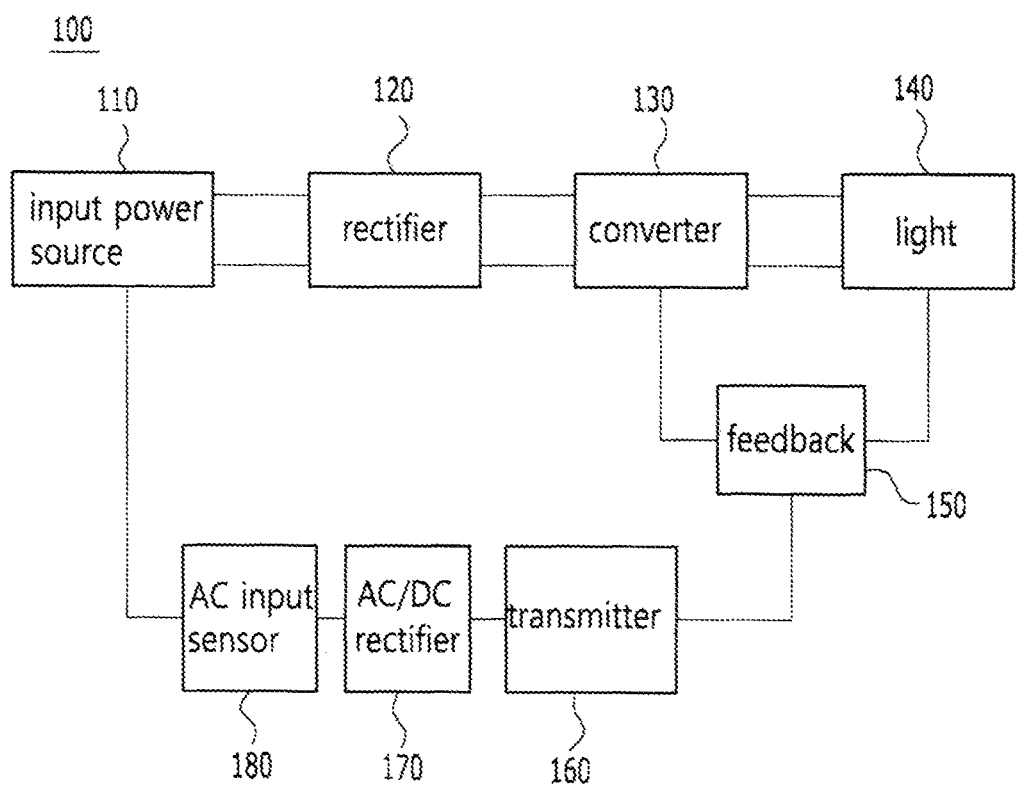
FIG. 1 is a view of a configuration of a conventional lighting control apparatus.

Hereinafter, with reference to the attached drawings, an apparatus for sensing input power source according to preferred embodiments of the present invention will be described in detail. The example embodiments which will be described later are provided to make those skilled in the art easily understand the present invention, and hence, it should be understood that there is no intent to limit the present invention, to the particular forms of the embodiments. Matters illustrated in the attached drawings are schematized in the drawings in order to easily explain the embodiments of the present invention, and hence, may be different from the actual forms.

In the meantime, it should be further understood that components described hereinafter are just examples for realizing the present invention. Therefore, the present invention may have different components without departing from the technical idea and scope of the present Invention. Furthermore, the components of the present invention may be realized lust by hardware or software, but may be realized in combination of various hardware and software parts which carry out the same functions.

Moreover, it should be also understood that the terms of 'include' or 'have' in the specification are 'open type' expressions just to say that components exit and do not exclude additional components.

Additionally, it should he also understood that the terms, such as 'first' and 'second', are just used to tell plural components and do not restrict order or characteristics among the components.

In addition, in the present invention, 'power source' includes all kinds of electric energies to he used to general electric circuits, such as 'voltage', 'electric power' and 'current'.

FIG. 1 illustrates a configuration of a conventional lighting control apparatus.

Referring to FIG. 1, the conventional lighting control apparatus requisitely includes various components, such as the AC input sensor 180, the AC/DC rectifier 170 and the transmitter 160, in order to configure circuits to sense input power source and apply the circuits to the components. Additionally, the conventional lighting control apparatus still has inconvenience to control the circuits not to be against the safety requirements which are different in many countries.

Figure 2:
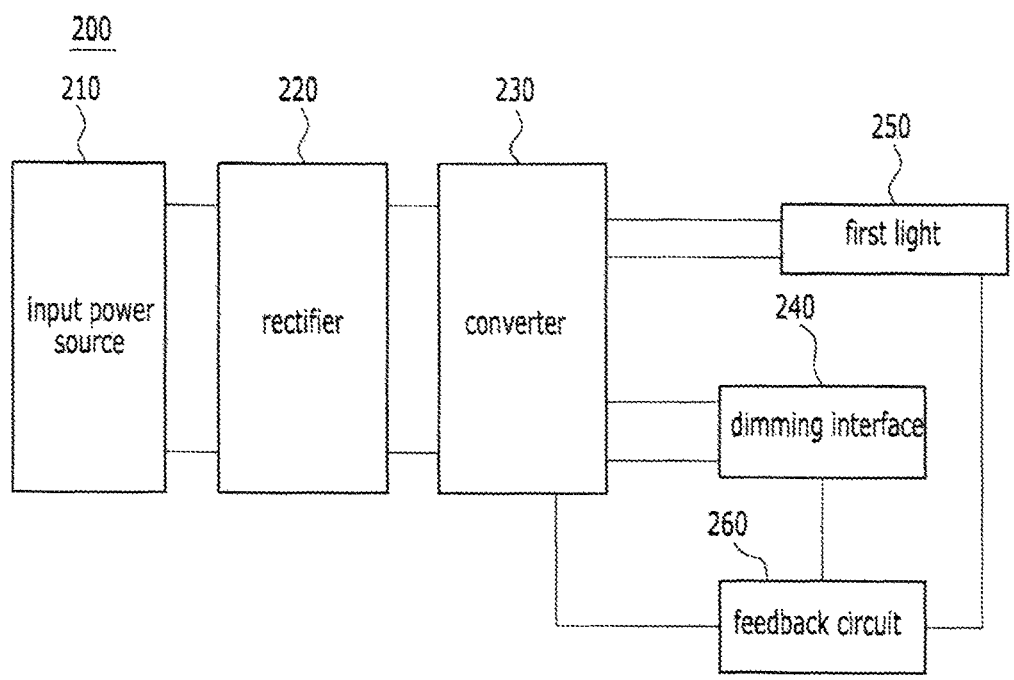
FIG. 2 is a view of a configuration of an apparatus for sensing input power source according to a preferred embodiment of the present invention.
Figure 3:
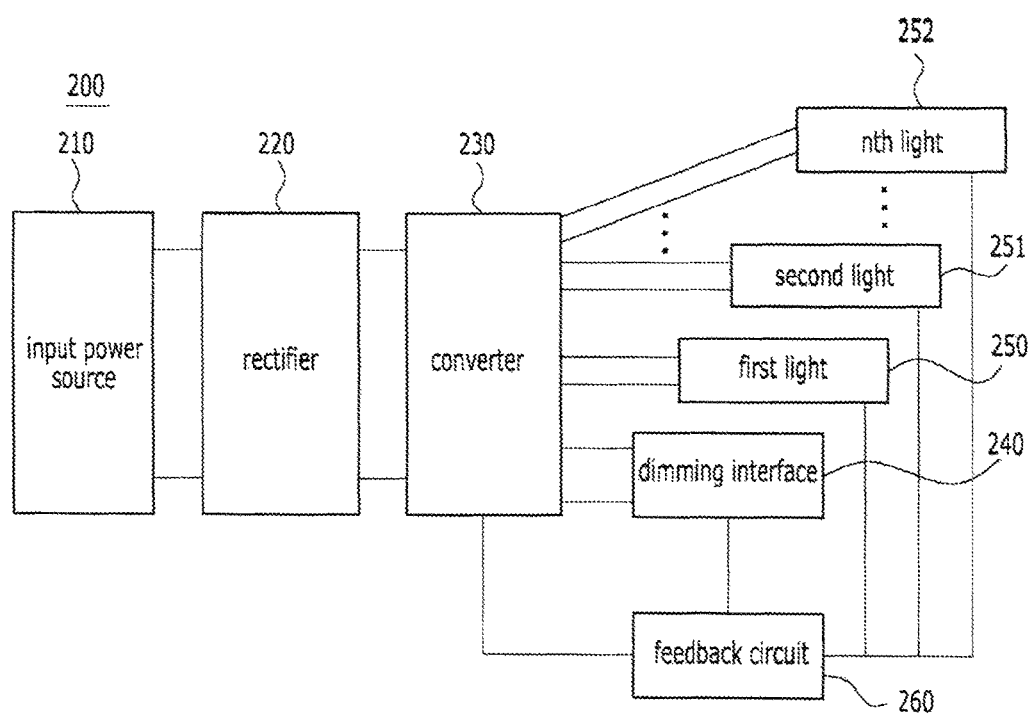
FIG. 3 is an exemplary view showing a configuration that a plurality of lights are mounted on the input power sensing apparatus according to the present invention.

FIG. 2 is a view of a configuration of an apparatus for sensing input; power source according to a preferred embodiment of the present invention, and FIG. 3 is an exemplary view showing a configuration that a plurality of lights are mounted on the input power sensing apparatus according to the present invention.

Referring to FIG. 2, the input power source sensing apparatus 200 according to the preferred embodiment of the present invention includes an input power unit 210, a rectifier 220, a converter 230, a dimming interface 240, a first light 250 and a feedback circuit 260.

The input power unit 210 provides input power source necessary for the input power source sensing apparatus or a dimming control apparatus, and in this instance, it is preferable that input power source (Vin) be commercial AC power 220V. The rectifier 220 rectifies the input power source (Vin) of the input power source into rectified power source (Vr). The lighting unit is operated by DC power source, but because the power source is AC power source, it is necessary to convert the commercial AC power source into DC power source. For this, the present invention includes the rectifier 220.

The rectifier 220 may be implemented through rectifier elements of various types, such as a bridge rectifier, a half bridge rectifier, a full bridge rectifier and so on.

The converter 230 converts the rectified power source (Vr) into a first power source (V21) and a second power source (V22) which were preset and applies the converted power sources to the dimming interface and the first light. In this instance, the first power source and the second power source which were preset can be controlled according to a turns ratio of the primary side/the secondary side of the transformer 231 included in the converter 230. Moreover, the converter includes the transformer 231, a switch 235 and a controller 236, and referring to FIG. 4, operations of the components will be described in detail.

The dimming interface 240 is connected to the converter to sense the state of the input power source. Furthermore, the dimming interface includes a dimming output terminal 241, a peak rectifier 242 and a dimming signal generator 243, and referring to FIG. 4, operations of the components will be described in detail.

The first light 250 is connected to the converter, serves as a light source by converting the applied second power source into light energy. All light sources capable of being used as a lighting unit, such as incandescent lamps, fluorescent lamps, LEDs and OLEDs, can be applied. In this instance, the dimming interface and the first light are reconnected to the converter in a feedback type so as to transfer information of the present output power to the PWM controller included in the converter.

Moreover, referring to FIG. 3, a second light, a third light, . . . , a nth light may be further included in such a way that a single input power sensing apparatus can control the plural lights. In this instance, the lights can receive electric power through windings added to the secondary side of the transformer. Because the received electric power is varied according to the turns ratio between the primary side and the secondary side, when the turns ratio is controlled, different power sources can be applied to the plural lights. In addition, the second light, the third light . . . and the nth light are reconnected with the converter in the feedback type so as to transfer information of the present output power source to the PWM controller included in the converter.

In this instance, the order that the lights and the dimming interface are located on the transformer can he freely arranged according to a user's setting.

Figure 4:
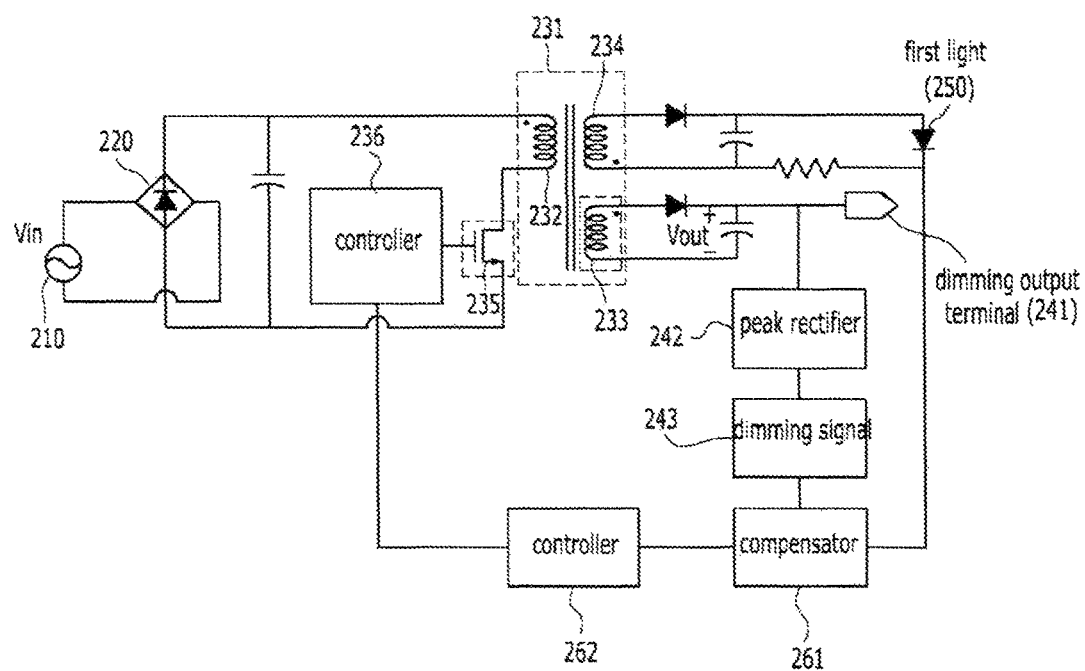
FIG. 4 is a circuit diagram showing a detailed configuration of the input power sensing apparatus according to the present invention.

FIG. 4 is a circuit diagram showing a detailed configuration of the input power sensing apparatus according to the present invention.

Referring to FIG. 4, the converter 230 includes the transformer 231, the switch 235 and the PWM controller 236.

The transformer 231 includes a primary winding and a plurality of secondary windings, and can apply power source applied to the primary winding by an induced electromotive force to the secondary winding according to the turns ratio. In this instance, the transformer includes; a first winding 232 which is located at the primary side to receive the rectified power source (Vr); a second winding (233) which is located at the secondary side to receive the first power source (V21) according to the turns ratio with the first winding and is connected to the dimming interface; and a third winding 234 which is located at the secondary side to receive the second power source (V22) according to the turns ratio with the first winding and is connected to the first light. Therefore, the second power source (V22) is applied to the first light, and the first power source (V21) is applied to the dimming interface.

Figure 5:
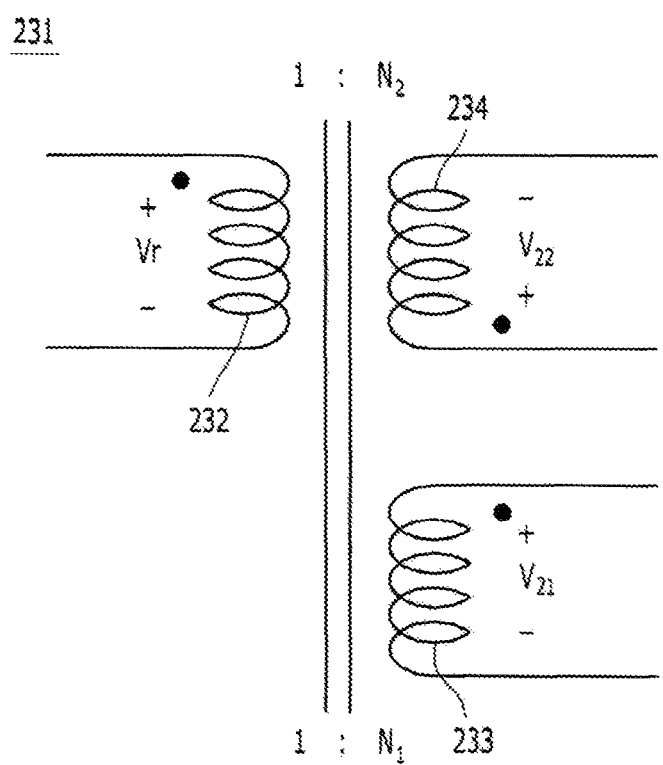
FIG. 5 is a circuit diagram showing a turns ratio and applied power source of windings of a transformer located at the primary side and the secondary side.

Referring to FIG. 5, when, the turns ratio of the first winding 232 to the second winding 233 is 1:N1 and the turns ratio of the first winding 232 to the third winding 234 is 1:N2, intensity of voltage is determined by the following relational formula. In this Instance, the turns ratios, 1:N1 and 1:N2, may be implemented at the same turns ratio or at different turns ratios according to the user's setting.

Relational Formula $$V_r = \frac{V_{21}}{N_1}, V_r = \frac{V_{22}}{N_2}$$

Furthermore, the second winding is a forward converter in the same direction as the first winding, and the third winding is a flyback converter in the reverse direction to the first winding. The dimming interface uses winding for the forward converter to transfer voltage as it is because serving to sense input power source, and the lighting unit uses winding for the flyback converter which is varied according to output voltage. Moreover, if a plurality of the lights are added, windings respectively connected with the: lights are flyback converters. The switch 235 turns on and off the entire of the converter 230. The switch may be connected with the first winding in series. Additionally, it is preferable that the switch be a field effect, transistor (FET), and the PWM controller may be connected with a gate of the FET.

PWM controller 236 controls the switch. The power source applied to the first winding 232 becomes DC power source after passing through the rectifier 220, and in this instance, when the switch is turned on and off on a cycle (D; duty) by the PWM controller, the DC power source is converted into a square wave form.

The dimming interface 240 senses the state of the input power: source, In this instance, the dimming interface includes the dimming output terminal 241, the peak rectifier 242 and the dimming signal generator 243.

The dimming output terminal 241 can sense output power source when the output power source is applied in proportion to the preset input power source. The output power source sensed by the dimming output terminal 241 is proportional to the input power source according to the turns ratio of the transformer. Therefore, when the output power source is measured, the input power source can be calculated by the following formula:

$$V_{in} = \frac{1}{N1} \times \frac{1}{D} \times V_{out},$$

wherein Vin is input power source, Vout is output power source, N1 is a turns ratio of the second winding, and D is a cycle of input power source.

Figure 6:
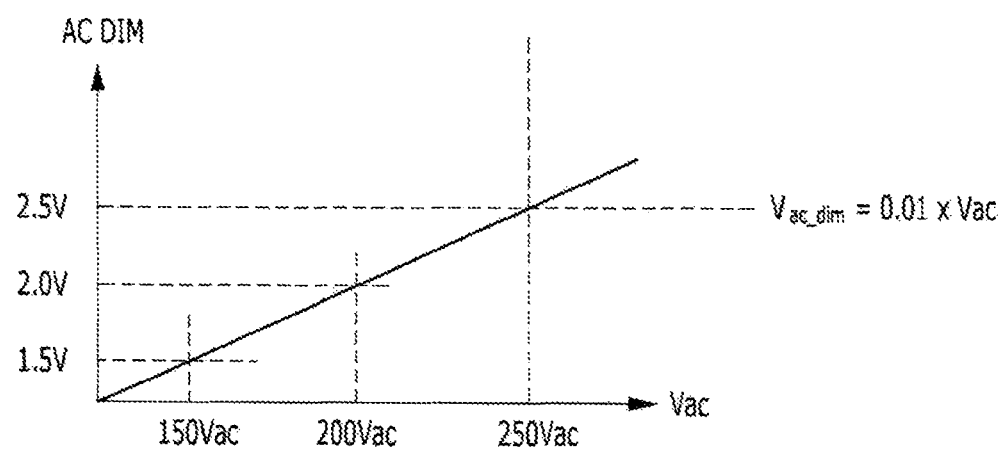
FIG. 6 is a graph showing that output power source sensed by an output terminal of the input power source sensing apparatus according to the preferred embodiment, of the present invention is proportional to the input power source.

Therefore, referring to FIG. 6, because the output power source sensed by the output terminal of the input power source sensing apparatus is proportional to the input power source, when the output power source is measured, the input power source, can be sensed.

The peak rectifier 242 rectifies the output power source into DC and transfers the rectified DC power source to the dimming signal generator 243. Moreover, the dimming signal generator 243 is connected with the peak rectifier in series to generate references to be used in a compensator 261.

Furthermore, the input power source sensing apparatus 200 according to the preferred embodiment of the present invention further includes a compensator 261 and a feedback controller 262.

The compensator 261 compensates according to references generated by the dimming interface and transfers a compensated value to the feedback controller, and the feedback controller 262 transfers the value compensated by the compensator to the converter.

In this instance, the compensator is connected with the dimming interface and the first light, and the compensator and the feedback controller are connected to the PWM controller in series.

While the present invention has been particularly shown and described with reference to exemplary embodiments thereof, it will be understood by those of ordinary skill in the art that there is no intent to limit example embodiments of the invention to the particular forms disclosed and that various changes and modifications may be made therein without departing from the technical idea and scope of the present invention and such changes and modifications belong to the claims of the present invention.

What is claimed is:

1. An apparatus for sensing input power source, comprising:
    an input power source;
    a rectifier for rectifying input power source (Vin) of the input power source into rectified power source (Vr);
    a dimming interface for sensing the state of the input power source;
    a first light; and
    a converter for converting the rectified power source (Vr) into a first power source (V21) and a second power source (V22) which were preset to apply them to the dimming interface and the first light,
    wherein the dimming interface and the first light are connected with the converter in a feedback type.

2. The apparatus according to claim 1, wherein the converter comprises:
    a transformer having a winding of the primary side and a plurality of windings of the secondary side;
    a switch for turning on and off the converter; and a PWM controller for controlling the switch.

3. The apparatus according to claim 2, wherein the transformer comprises:
    a first winding which is located at the primary side to receive the rectified power source (Vr);
    a second winding which is located at the secondary side to receive the first power source (V21) according to the turns ratio with the first winding and is connected to the dimming interface; and
    a third winding which is located at the secondary side to receive the second power source (V22) according to the turns ratio with the first winding and is connected to the first light.

4. The apparatus according to claim 3, wherein the turns ratio of the first winding to the second winding is 1:N1 and the turns ratio of the first winding to the third winding is 1:N2.

5. The apparatus according to claim 3, wherein the first winding and the switch are connected to each other in series.

6. The apparatus according to claim 3, wherein the second winding is a forward converter which is in the same direction as the first winding, and the third winding is a flyback converter which is in the reverse direction to the first winding.

7. The apparatus according to claim 3, further comprising:
    a second light, a third light, . . . , and a nth light,
    wherein the transformer includes a plurality of windings which are located at the secondary side to receive power Source according to the turns ratio with the first winding and are respectively connected to a plurality of the lights.

8. The apparatus according to claim 7, wherein, the windings are flyback converters which are in the opposite direction to the first winding.

9. The apparatus according to claim 7, wherein the second light, the third light . . . and the nth light are reconnected with the converter in the feedback type.

10. The apparatus according to claim 2, wherein the switch is an FET, and the PWM controller is connected with a gate of the FET.

11. The apparatus according to claim 1, wherein the input power source (Vin) is commercial AC power source (220V).

12. The apparatus according to claim 1, wherein the rectifier is a bridge rectifier.

13. The apparatus according to claim 1, wherein the dimming interface comprises;
    a dimming output terminal for sensing the output power source when the output power source is applied in proportion to the preset input power source;
    a peak rectifier for rectifying the output power source into DC; and
    a dimming signal generator which is connected with the peak rectifier in series to generate references.

14. The apparatus according to claim 13, wherein the output power source of the output terminal is determined by the following formula:

$$V_{in} = \frac{1}{N1} \times \frac{1}{D} \times V_{out},$$

wherein Vin is input power source, Vout is output power source, N1 is a turns ratio of the second winding, and D is a cycle of input power source.

15. The apparatus according to claim 1, further comprising:
   a. compensator which compensates according to references generated by the dimming interface and transfers a compensated value to the feedback controller; and
   a feedback controller which transfers the value compensated by the compensator to the converter.

16. The apparatus according to claim 15, wherein the compensator is connected with the dimming interface and the first light, and
   wherein the compensator and the feedback controller are connected to the PWM controller of the converter in series.

* * * * *